United States Patent [19]

Matsunaga

[11] Patent Number: 5,331,475
[45] Date of Patent: Jul. 19, 1994

[54] ELECTRONIC SPLICING OPERATION CONTROL DEVICE FOR A FOUR HEAD TYPE MAGNETIC RECORDING AND/OR REPRODUCING APPARATUS

[75] Inventor: Yoriaki Matsunaga, Chigasaki, Japan

[73] Assignee: Victor Company of Japan, Ltd., Yokohama, Japan

[21] Appl. No.: 965,034

[22] Filed: Oct. 22, 1992

Related U.S. Application Data

[63] Continuation of Ser. No. 572,640, Aug. 27, 1990, abandoned.

[30] Foreign Application Priority Data

Aug. 31, 1989 [JP] Japan .................................. 1-225214

[51] Int. Cl.⁵ .......................... G11B 27/02; G11B 5/09
[52] U.S. Cl. ...................................... 360/14.2; 360/46
[58] Field of Search ........................ 360/14.1, 14.2, 27, 360/37.1, 64; 358/311

[56] References Cited

U.S. PATENT DOCUMENTS

| | | | |
|---|---|---|---|
| 4,570,192 | 2/1986 | Hori | 360/14.2 |
| 4,605,976 | 8/1986 | Ito et al. | 360/70 |
| 4,673,991 | 6/1987 | Namiki et al. | 360/14.1 |

FOREIGN PATENT DOCUMENTS 59-217256 12/1984 Japan .
60-179960 9/1985 Japan .

*Primary Examiner*—Donald Hajec
*Assistant Examiner*—Won Tae C. Kim
*Attorney, Agent, or Firm*—Lowe, Price, LeBlanc & Becker

[57] ABSTRACT

A four-head type magnetic recording and/or reproducing apparatus uses control pulses having two kinds of duty factors for preventing a first video head from reproducing video signals recorded by a second video head opposite to the first video head and performing the recording and reproducing of the video signals by an identical video head. An electronic splicing control for such a recording and/or reproducing apparatus includes a duty-factor changing device for setting a first and second values of the duty factors of the control pulses at the time of normally recording video signals and changing the first and second values into a third and fourth values, respectively at the time of performing the electronic splicing of video signals, in such a manner that one of the third and fourth values is nearly equal to one of the first and second values. Thereby, the electronic splicing control can fully prevent a video head from reproducing video signals recorded by another video head opposite thereto, and at the same time the electronic splicing of video signals can be well performed.

4 Claims, 8 Drawing Sheets

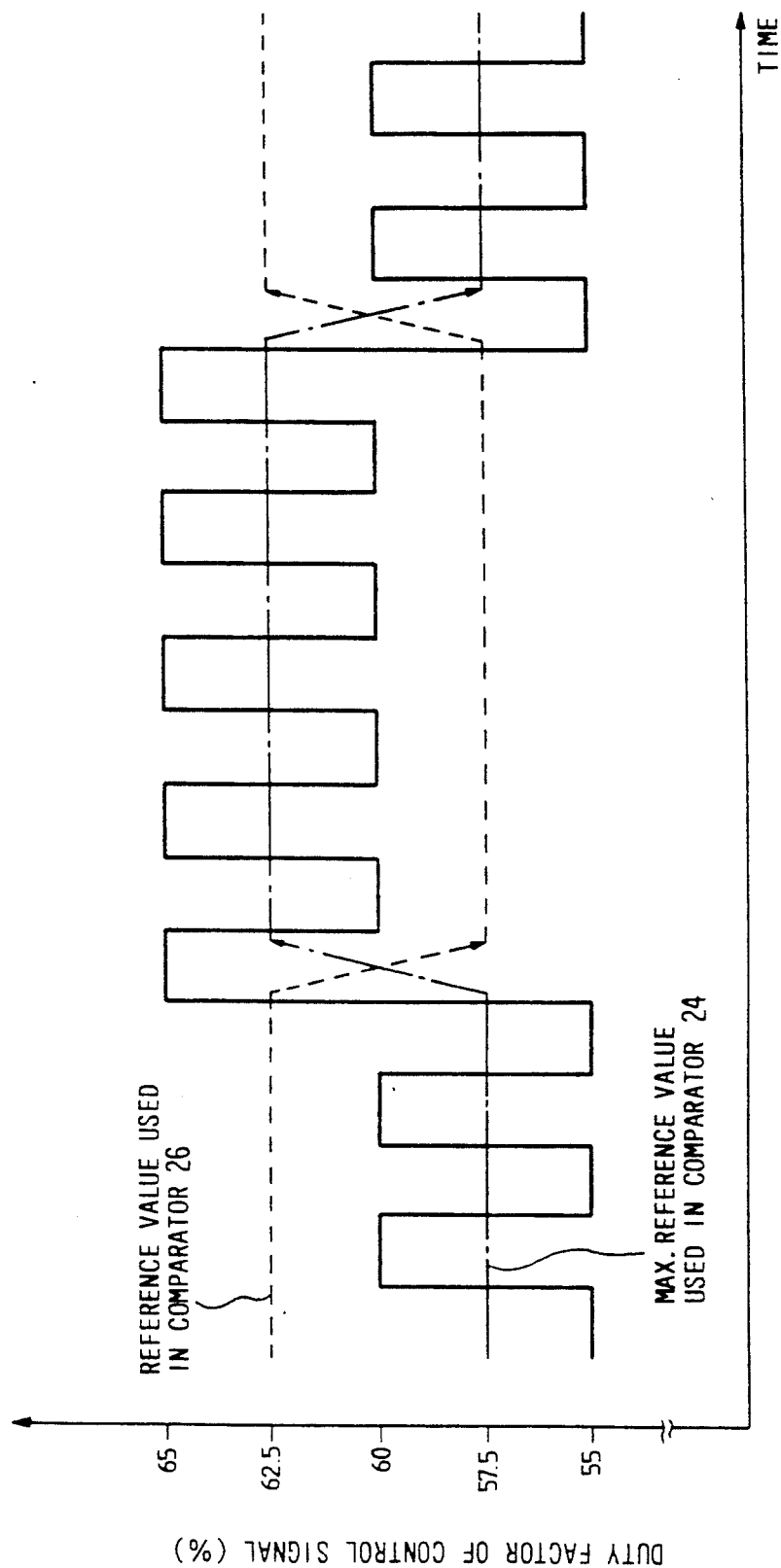

ELECTRONIC SPLICING OPERATION CONTROL DEVICE FOR A FOUR HEAD TYPE MAGNETIC RECORDING AND/OR REPRODUCING APPARATUS

This application is a continuation of application Ser. No. 07/572,640 filed Aug. 27, 1990.

BACKGROUND OF THE INVENTION

1. Field of The Invention

This invention generally relates to an electronic splicing device, which is used to edit videotape by carrying out electronic splicing (i.e., assemble editing) thereof, for use in a magnetic recording and/or reproducing apparatus such as a video tape recorder (VTR) and more particularly to an electronic splicing device for use in a magnetic recording and/or reproducing apparatus in which two mutually orthogonal pairs of azimuth video heads are mounted on a rotating drum having small diameter and the azimuth video heads of each pair have the same azimuth angle but the azimuth angle of the azimuth video heads of one of the pairs is different from that of the azimuth video heads of the other pair.

2. Description of The Related Art

Referring first to FIG. 9, there is shown a conventional four-head VTR provided with two mutually orthogonal pairs of azimuth heads (A, C; and B, D), which function as recording and/or reproducing heads and are equally spaced apart and mounted on a rotating drum of small diameter, so that adjacent azimuth video heads are spaced apart by 90 degrees. As illustrated in this figure, video tape is guided by stationary guide posts or poles 12 and 14 and is further pulled around a part of the peripheral surface of the drum 10 over an angular range which is a little more than 270 degrees. The diameter L of the drum 10 is selected in such a manner to meet the condition $L=(\frac{2}{3})M$ where M is head drum diameter of an ordinary existing two-head video recorder.

Further, the azimuth video heads A and C of one of the pairs have the same azimuth angle. Similarly, the azimuth video heads B and D of the other pair have the same azimuth angle. In case where this conventional four-head video tape recorder is of NTSC (National Television Systems Committee) type, each of these heads A, B, C and D and travels by one track pitch while rotates by a slightly larger than 270 degrees at about 45 revolutions per second (rps) around an axis of rotation of the drum 10. (Incidentally, in case where this conventional four-head video tape recorder is of CCIR (Commité Consultatif International des Radio-Communications) type, each of the heads A, B, C and D runs at approximately 37.5 rps.) The relative linear velocity or speed of each of the heads with respect to the tape in case of this conventional VTR is equal to that obtained in the ordinary existing VTR. Thus, this conventional four-head VTR provides tape compatibility with ordinary existing two-head VTRs. Further, two video signal frames are recorded or reproduced during three revolutions of the drum 10.

When video signals are recorded and reproduced by using the video heads of the same pair of a conventional four-head VTR, there may occur two cases with regard to two heads used to record the signals on a track and reproduce the signals from the identical track. Namely, in one of the two cases, the identical head (e.g., the head A) is used for both recording and reproducing of the signals. Hereunder, the reproducing of signals in this case will be referred to as "proper track reproduction". In the other case, a video head used to record signals on a track is different from another head used to reproduce the recorded signals from the identical track. For example, the head A is used to record video signals on a track and further the head C, which is mounted at an opposite position on the drum 10 with respect to the head A, is used to reproduce the signals from the very identical track. Hereunder, the reproducing of signals in this case will be referred to as "improper track reproduction".

In case of the "improper track reproduction", a video head used for recording video signals (hereunder sometimes referred to as a recording head) is not identical with a video head used for reproducing the video signals (hereunder sometimes referred to as a reproducing head), which, however, has the same azimuth angle as the recording head does. Further, the reproducing head is liable to differ in mechanical and electrical characteristics from the recording head. This hinders the reproduction of an image with high picture quality. Therefore, it is preferable to prevent occurrence of the "improper track reproduction". An example of a countermeasure for preventing the occurrence of the "improper track reproduction" is disclosed in, e.g., the Japanese Patent Application Provisional Publication No. 59-217256 Official Gazette (see the corresponding U.S. Pat. No. 4,605,976). In accordance with the invention disclosed therein as illustrated in FIG. 10 (B) of the instant application, the duty factor of a control signal to be recorded on a tape is adapted to vary every frame with respect to a video signal shown in FIG. 10 (A).

Namely, the duty factor is large in frames recorded by using the heads A and B, while the duty factor is small in frames recorded by using the heads C and D. Thus, it can be judged from the time of a fall in a pulse of the control signal which of the head A and the head C (alternatively, which of the head B and the head D) a reproducing head is. Thereby, the occurrence of the "improper track reproduction" can be prevented. The above described technique of preventing the occurrence of the "improper track reproduction" by making use of variation in duty factor of a control signal does not demand special signal processing. Further, a VTR employing this technique ensures tape compatibility with devices such as a Video Home System (VHS) VTR and a Super VHS (S-VHS) VTR.

Generally, in a VTR, when editing signals are recorded on videotape, an electronic splicing operation (i.e., an assemble editing operation or assembled recording operation) is frequently performed by temporarily stopping a recording operation, moving the videotape in a reverse direction over a predetermined distance and then resuming tape travel in a forward direction so as to start to record a new signal immediately after (i.e., substantially in continuance with) a previously recorded signal. As an example of techniques of improving the precision of the electronic splicing, can be cited an editing system of carrying out assembled recordings disclosed in the Japanese Patent Application Provisional Publication No. 60-179960 Official Gazette (see the corresponding U.S. Pat. No. 4,673,991). In this editing system, when the recording of video signals is once stopped, a joint indication signal (hereunder referred to simply as an indication signal) is recorded on videotape as a signal indicating change in duty factor of a control signal. Further, a beginning point for resuming the recording of a video signal on the tape is detected on the basis of the indication signal.

FIG. 11 shows signal waveforms for explaining an example of operations of this editing system. When a recording pause instruction is issued in the course of a recording operation in order to interrupt the recording of video signals and perform an electronic splicing operation (i.e., assemble editing operation), an indication signal, of which the duty factor is equal to 65%, is recorded on the tape as a control signal (see FIG. 11(B)). At that time, the recorded control signal on the tape has a pattern as illustrated in FIG. 11(C).

Further, at the time (indicated by an arrow F1) when a pulse, which follows immediately after a fourth pulse of the indication signal, of a head indicating signal shown in FIG. 11(A) falls, a video signal gets into a "muted" state, that is, the recording of the video signal is suppressed (see FIG. 11(D)). Subsequently, at the time (indicated by an arrow F2) when about 1 millisecond (mS) elapses from a fall of a fifth pulse of the indication signal, the recording of the control signal is ceased (see FIGS. 11(B), (C) and (E)). After that, the tape is rewound by a predetermined distance.

Next, when the pause (or temporary stop) in the recording of the video signal is ended and the recording operation is resumed, the rewound tape is driven and further the control signal recorded as above described is reproduced (see FIG. 11(k)). Namely, the processing of detecting the pattern of the recorded control signal on the tape (see FIG. 11(F)) is performed (see FIG. 11 (G)) and the recorded control signal is thus reproduced (see FIG. 11(H)).

Thereafter, at the time (indicated by an arrow F3) when about 1 mS elapses from a fall of a third pulse of the indication signal, a servo mode gets into a recording mode (see FIG. 11(J)). Further, the recording of video signals is started (FIG. 11(L)) at the time (indicated by an arrow F4) when a pulse, which follows immediately after a fourth pulse of the indication signal, of the head indicating signal falls (see FIG. 11(I)). As above described, the "muting" of the video signal is effected at the time F1 when the pulse, which follows immediately after the fourth pulse of the indication signal, of the head indicating signal falls, so that the electronic splicing of the video signal is carried out without loss of a video track on which the video signal is recorded. In FIG. 11, the arrows F1 and F4 indicate splice points, at each of which two adjacent records of video signals are spliced (i.e., starting positions of frames, each of which does not overlap with an adjacent frame).

Incidentally, the recording of the control signal is started (see FIG. 11(M)) at the time (indicated by an arrow F5) when a period of time corresponding to one frame elapses from the time (indicated by an arrow F3) of changing a servo mode. Thus, the recorded control signal on the tape has a pattern as illustrated in FIG. 11(N).

As described above, in each of cases of preventing the occurrence of the "improper track reproduction" and of performing the electronic splicing, the changing of the duty factor of the control signal is performed. Therefore, in order to simultaneously realize both of the prevention of the occurrence of the "improper track reproduction" and the electronic splicing, it is necessary to regulate the change in the duty factor according to control codes. Here, with regard to the duty factor of the control signal, prerequisites for simultaneously realizing both of the electronic splicing and the prevention of the "improper track reproduction" are summarized below.

(1) For the purpose of preventing the "improper track reproduction", the duty factor should be changed every frame. For example, if the duty factor for a certain frame is small, the duty factor for frames adjacent to the frame should be larger.

(2) On the other hand, for the purpose of carrying out the electronic splicing, an indication signal, which is continuous over several frames, should be recorded.

(3) In addition, for the sake of maintaining tape compatibility with other devices, VHS standards should be satisfied.

By taking into account the fact that according to the VHS standards, the duty factor for a control code "0" should range from 55% to 65%, the simplest way for simultaneously realizing both of the change of the duty factor as above described in the prerequisite (1) and the continuous indication signal as above described in the prerequisite (2) (i.e., realizing both of the electronic splicing and the prevention of the "improper track reproduction") is to change the duty factor in accordance with TABLE 1.

TABLE 1

| Duty Factor | Control Code "1" Signal | | Control Code "0" Signal | | | |
|---|---|---|---|---|---|---|
| | | | Normal Code Signal | | Indication Signal | |
| | Small | Large | Small | Large | Small | Large |
| % | 25 | 30 | 55 | 58.3 | 61.7 | 65 |

Incidentally, in case of the control code "1" signal shown in TABLE 1, VHS standards inhibit the VTR from simultaneously realizing both of the change of the duty factor as above described in the prerequisite (1) and the continuous indication signal as above described in the prerequisite (2).

The duty factor set in accordance with TABLE 1 can be discriminated by a single comparator (hereunder sometimes referred to as a "duty comparator"). In case of the control code "0" signal a reference value 56.6% is used by the "duty comparator" to judge or determine which of 55% and 58.3% is actually set as the duty factor; 60% is used to determine which of 58.3% and 61.7% the actual value of the duty factor is; and 63.4% is used to determine which of 61.7% and 65% is the actual value of the duty factor. Thus, the difference between each of the values of the duty factor and the corresponding reference value is in the order of 1%.

The above described judgement on the duty factor for preventing the "improper track reproduction" is performed immediately after a transition period in an operation of a VTR in order to decrease loss of time and improve operability of a VTR. Thus, if the comparison between the actual value of the duty factor and the reference value is made by using the above described reference value, of which the difference from the duty factor is not sufficiently large, in a transition state in which an operation of feeding the tape is not sufficiently stable, a malfunction can occur.

The present invention is accomplished to obviate the above described drawbacks of the conventional VTR.

It is accordingly an object of the present invention to provide an electronic splicing device for use in a magnetic recording and/or reproducing apparatus which can not only prevent the occurrence of the "improper track reproduction" but perform an electronic splicing of video signals well.

SUMMARY OF THE INVENTION

To achieve the foregoing object and in accordance with the present invention, there is provided an electronic splicing control for a four-head type magnetic recording and/or reproducing apparatus using control pulses having two kinds of duty factors for preventing the occurrence of the "improper track reproduction" and performing the "proper track reproduction". The device includes a duty-factor changing means for setting first and second values of the duty factors of the control pulses at the time of normally recording video signals and changing the first and second values of the duty factors of the control pulses into third and fourth values thereof, respectively at the time of performing the electronic splicing of video signals. One of the third and fourth values is nearly equal to one of the first and second values.

Thus, substantially, the values of the duty factors of the control signal are made to change among three levels, and the change of each duty factor is then detected. Thereby, can be preferably detected from a control signal having the duty factors suited for preventing the occurrence of the "improper track reproduction" and performing the electronic splicing of video signals. As a consequence, the occurrence of the "improper track reproduction" can be fully prevented, and at the same time the electronic splicing of video signals can be well performed.

Further, in accordance with a preferred embodiment of the present invention, there is provided an electronic splicing device, which comprises a duty-factor changing means for setting first and second values of the duty factors of control pulses at the time of normally recording video signals and changing the first and second values of the duty factors of the control pulses into third and fourth values thereof, respectively at the time of performing the electronic splicing of video signals. One of the third and fourth values is nearly equal to one of the first and second values. The device further includes a first duty-factor comparing means for detecting the control pulses having the duty factors of the first and second values by comparing each of the first and second values of the duty factors with a first reference value at the time of normally recording video signals. The first comparing means also detects the control pulses having the duty factors of the third and fourth values by comparing each of the third and fourth values of the duty factors with a second reference value at the time of performing the electronic splicing of video signals. A second duty-factor comparing means detects the control pulses having the duty factors of the third and fourth values by comparing each of the third and fourth values of the duty factors with a third reference value at the time of performing the electronic splicing of video signals.

Thus, pulses having two different duty factors are detected from a part of the tape, on which the indication signal is recorded, by the first duty-factor comparing means. The occurrence of the "improper track reproduction" can be prevented on the basis of the results of the detection performed by the first comparing means.

Further, at the time of effecting the electronic splicing of video signals, the pulses having the duty factors of the third and fourth values are continuously detected by the second duty-factor comparing means. The electronic splicing of video signals can be controlled on the basis of the results of the detection effected by the second duty-factor comparing means.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which:

FIG. 3 is a graph for illustrating control-signal detecting operations of the "duty comparators" of the embodiments of FIG. 1;

DETAILED DESCRIPTION OF THE PREFERRED EMBODIMENTS

Hereinafter, preferred embodiments of the present invention will be described by referring to the accompanying drawings.

Before being described in detail, a brief outline of a first embodiment of the present invention will be given hereinbelow. This embodiment employs a duty factor of 60% as a large duty factor of a normal code signal and a small duty factor of an indication signal as shown in TABLE 2.

TABLE 2

| Duty Factor | Control Code "1" Signal | | Control Code "0" Signal | | | |
|---|---|---|---|---|---|---|
| | | | Normal Code | | Indication Signal | |
| | Small | Large | Small | Large | Small | Large |
| % | 25 | 30 | 55 | 60 | 60 | 65 |

This results in that in both cases of a normal recording operation and an electronic splicing operation, the difference between a small duty factor and a corresponding large duty factor increases to 5% from 3.3% obtained in case of TABLE 1.

Figure 1:
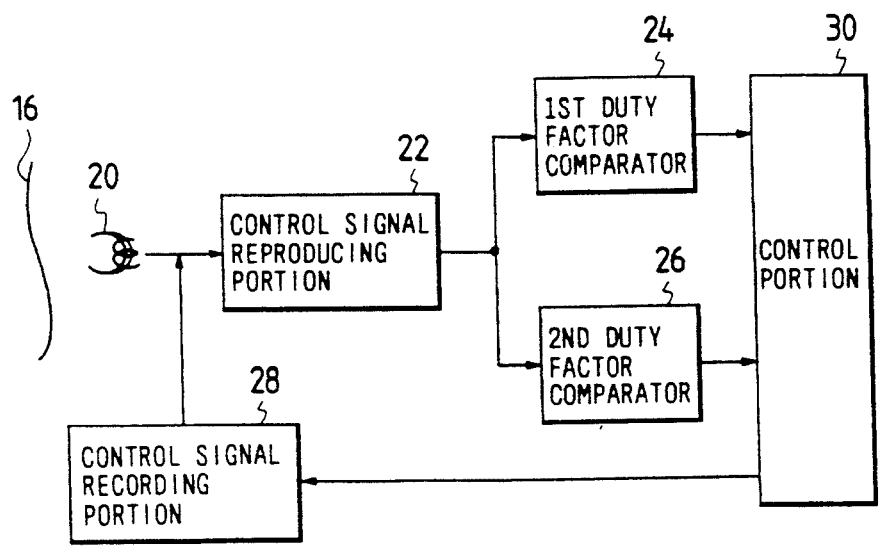
FIG. 1 is a schematic block diagram for illustrating the construction of primary portions of an embodiment of the present invention.

Referring first to FIG. 1, there is shown a basic arrangement of circuits of this embodiment for performing an electronic splicing operation in such a manner to be able to prevent the occurrence of the "improper track reproduction". In the arrangement of FIG. 1, a control signal recorded on videotape 18 is first read by a video head 20. Then, the thus read control signal is inputted to a control signal reproducing portion 22, whereupon the control signal is reproduced.

Subsequently, the reproduced control signal is inputted to both of a first and second duty comparators 24 and 26, of which outputs are further inputted to a control portion 30 and are further used to control operations of the VTR.

On the other hand, the recording of the control signal on the tape 16 is effected by a control signal recording portion 28, which generates the control signal having the duty factor as listed in TABLE 2 in accordance with signals representing instructions (e.g., a pause instruction) sent from the control portion 30 and then outputs the generated control signal to a video head 20.

In this embodiment, the first "duty comparator" (hereunder sometimes referred to simply as a first comparator) 24 is used to prevent the occurrence of the "improper track reproduction". On the other hand, the second "duty comparator" (hereunder sometimes referred to simply as a second comparator) 26 is used in an electronic splicing operation. Further, each of the first and second comparators is adapted to change the reference value as in case of the control code "0" signal.

Figure 2A:
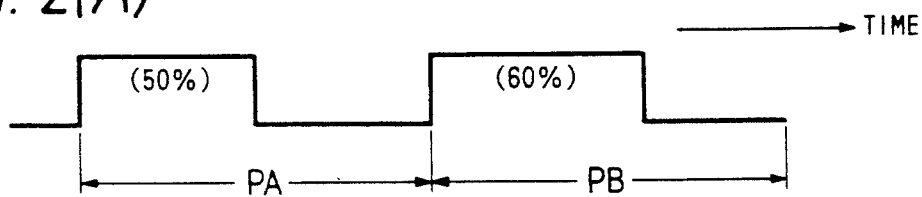
FIG. 2(A)–2(B) is a diagram for illustrating an operation of "duty comparators" of the embodiment of FIG. 1.
Figure 2B:
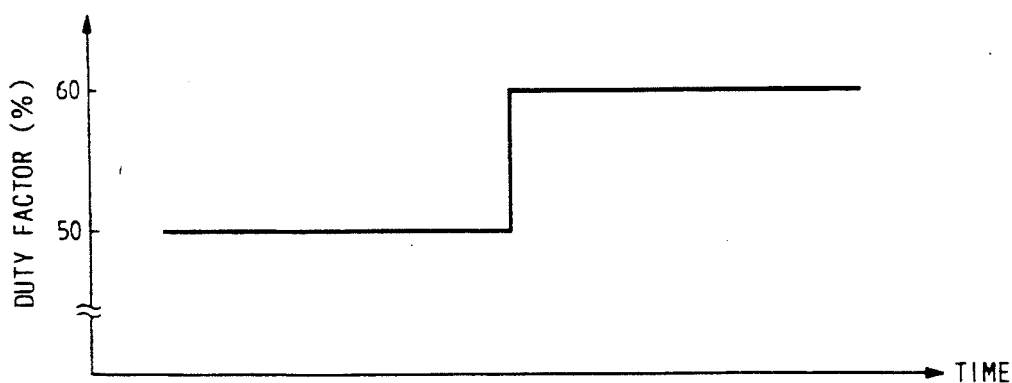

Further, the "duty comparators" 24 and 26 perform comparing operations by using the reference values set for the duty factors of input pulses of the video signals. For instance, it is assumed that a pulse PA, of which the duty factor is 50%, and a pulse B, of which the duty factor is 60%, as shown in FIG. 2 (A) are serially inputted to a "duty comparator" as an input signal. In this case, the result of the comparison made by the "duty comparator" is illustrated in FIG. 2 (B), in which the axis of ordinate represents the duty factor.

If the duty factors of the pulses PA and PB are compared with a reference value 55% in the "duty comparator", the pulse PA is not detected but the pulse PB is detected. Here, note that strictly speaking, it is not until a fall of the pulse PA shown in FIG. 2(A) that the result of the comparison is obtained. However, for simplicity of description, a signal indicating the result of the comparison is illustrated as in FIG. 2(B) by making a part of the signal indicating the result of the comparison correspondent to one cycle of the pulse PA (hereunder, signals indicating results of the comparison made by a "duty comparator" is illustrated in a similar manner as in FIG. 2(B)).

First, the first comparator 24 usually uses reference values 27.5%, 50% and 57.5%. These reference values, however, are changed into 27.5%, 50% and 62.5%, respectively when a control signal, of which the duty factor is equal to or greater than 62.5, is inputted thereto. Thereafter, these reference values are further changed back into 27.5%, 50% and 57.5%, respectively when a control signal, of which the duty factor is equal to or less than 57.5%, is inputted thereto. Incidentally, the reference value 50% may be replaced with another value which is greater than 30% and is less than 55%.

In contrast, the second comparator 26 usually uses a reference value 62.5%. However, when a control signal, of which the duty factor is equal to or greater than 62.5%, is inputted thereto, this reference value is changed into 57.5% at the same time that a first indication signal is detected. Thereafter, when a control signal, of which the duty factor is equal to or less than 57.5%, is inputted thereto, it is judged that the inputted control signal is not an indication signal, and moreover the reference value is changed back into 62.5%.

Next, control-signal detecting operations of the comparators 24 and 26 will be described hereinbelow with reference to FIG. 3. First, a control signal is generated by the control signal recording portion 28 in such a fashion that the generated control signal has a duty factor as listed in TABLE 2. Then, the generated control signal, of which the duty factor changes as indicated by, e.g., solid lines in FIG. 3, is recorded on the tape 16.

Namely, first, a pulse of a normal code signal having a large duty factor of 60% and another pulse of a normal code signal having a small duty factor of 55% are alternately recorded on the tape. Subsequently to the pulse of the normal code signal having a small duty factor, an indication signal for the electronic splicing is recorded, namely, a pulse of the indication signal having a large duty factor of 65% and another pulse of the indication signal having a small duty factor of 60% are alternately recorded on the tape. Further, following the pulse of the indication signal having a large duty factor, tile pulse of the normal code signal having the large duty factor and the pulse of the normal code signal having the small duty factor are alternately recorded on the tape.

Figures 4, 8:
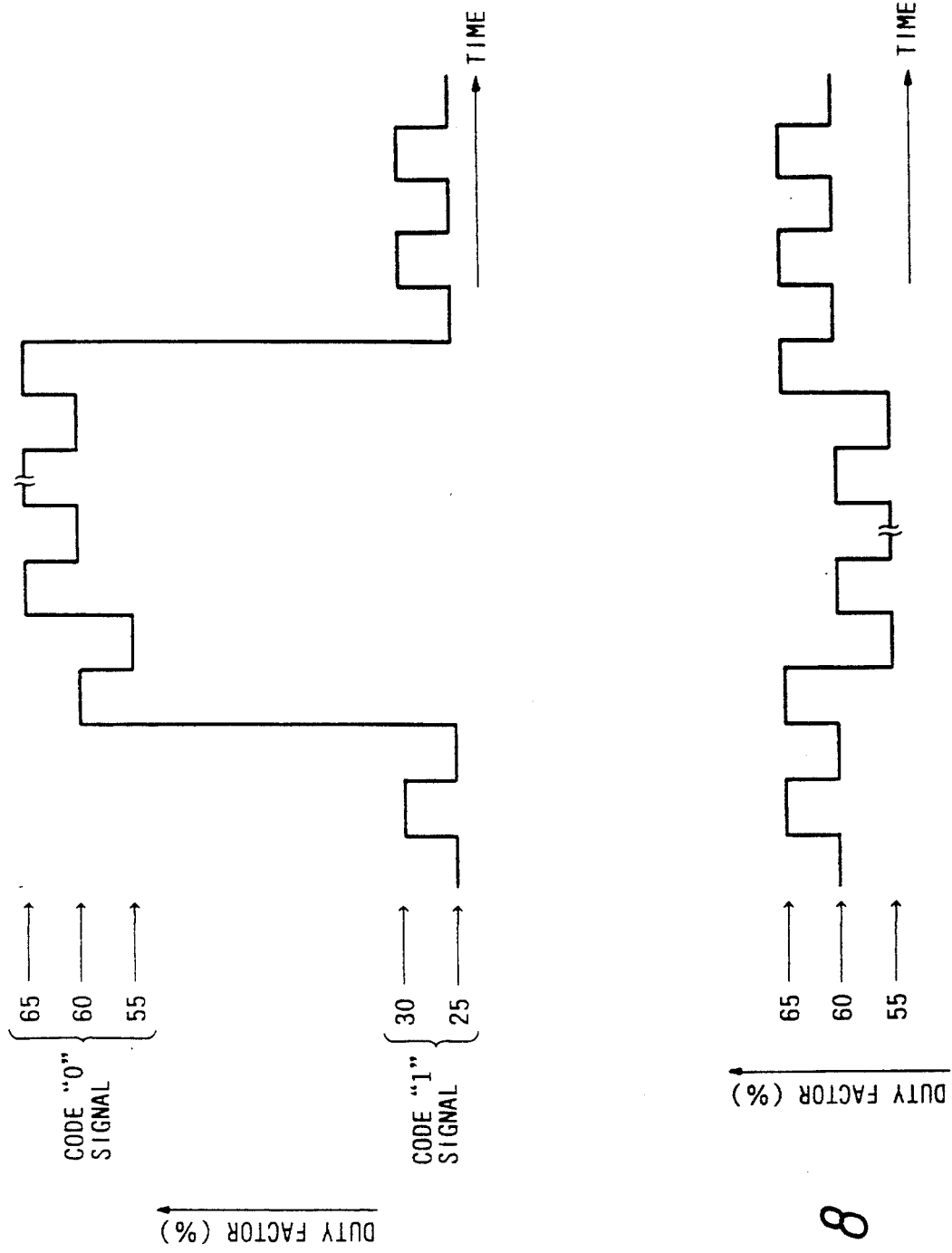
FIG. 4 is a diagram for illustrating transition between a signal according to the control code "1" and an indication signal.
FIG. 8 is a diagram for illustrating still another embodiment of the present invention.

Incidentally, the transition from a control code "1" signal to an indication signal as shown in FIG. 4 is inhibited with a view to preventing an indication signal from intervening in a plurality of control code "1" signals, which are recorded on the tape as a signal used to preset a reproducing head at a beginning point for reproducing video signals. However, as shown in FIG. 4, the transition from a pulse of the indication signal having a large duty factor to a pulse of the control code "1" signal having a small duty factor is not inhibited.

In response to such control signals, the largest reference value used by the first comparator 24 changes as indicated by one-dot chain lines in FIG. 3. First, the first comparator 24 employs the reference value of 57.5% for the normal code signal, thereby discriminating between the pulse of the normal code signal having the large duty factor of 60% from the pulse of the normal code signal having the small duty factor of 55% and detecting them. Next, the reference value is changed into 62.5% for the detection of the indication signal, thereby similarly discriminating between and detecting the pulse of the normal code signal having the large duty factor of 65% from the pulse of the normal code signal having the small duty factor of 60%.

Thus, in case where the control signal is either of the normal code signal and the indication signal, it is judged whether the duty factor of the control signal is large or small. Conversely, a method using the large and small duty factors of the control signal is employed in the VTR to make use of the discrimination between the large and small duty factors for the purpose of preventing the occurrence of the "improper track reproduction". Consequently, a discrimination signal used for preventing the occurrence of the "improper track reproduction" is preferably obtained by the first comparator 24.

In contrast with this, the reference value used by the second comparator 26 changes as indicated by dashed lines in FIG. 3. First, the second comparator 26 employs the reference value of 62.5% for the normal code signal, whereby both of the pulse of the normal code signal having the large duty factor of 60% and the pulse of the normal code signal having the small duty factor of 55% are not detected. Next, the reference value is changed into 57.5% for the detection of the indication presence of the signal as stated above, thereby detecting both pulses of the normal code signal having the large duty factor of 65% and pulses of the normal code signal having the small duty factor of 60%.

In this way, the second comparator 26 performs the continuous detection of the indication signal and as a result preferably obtains a discrimination signal used for performing the electronic splicing of video signals.

Next, an operation of preventing the occurrence of the "improper track reproduction" by recording the control signal having a variable duty factor will be described hereinbelow with reference to FIG. 5. As described above, two video signal frames are recorded on the tape during three revolutions of the drum. Thus, as illustrated in FIGS. 5(A), (B) and (C), two video signal frames are recorded by video signals A, B, C and D during a period of time corresponding to three drum PG signals. In this embodiment, the video heads A and B correspond to a reference portion of a reference indicating signal, and the video heads C and D correspond to a non-reference portion of the reference indicating signal (see FIG. 5(D)). Further, the reference indicating pulse is obtained by dividing the frequency of a head indicating signal by ($\frac{1}{2}$) on the basis of a ($\frac{1}{3}$)-frequency division PG signal.

Figure 5:
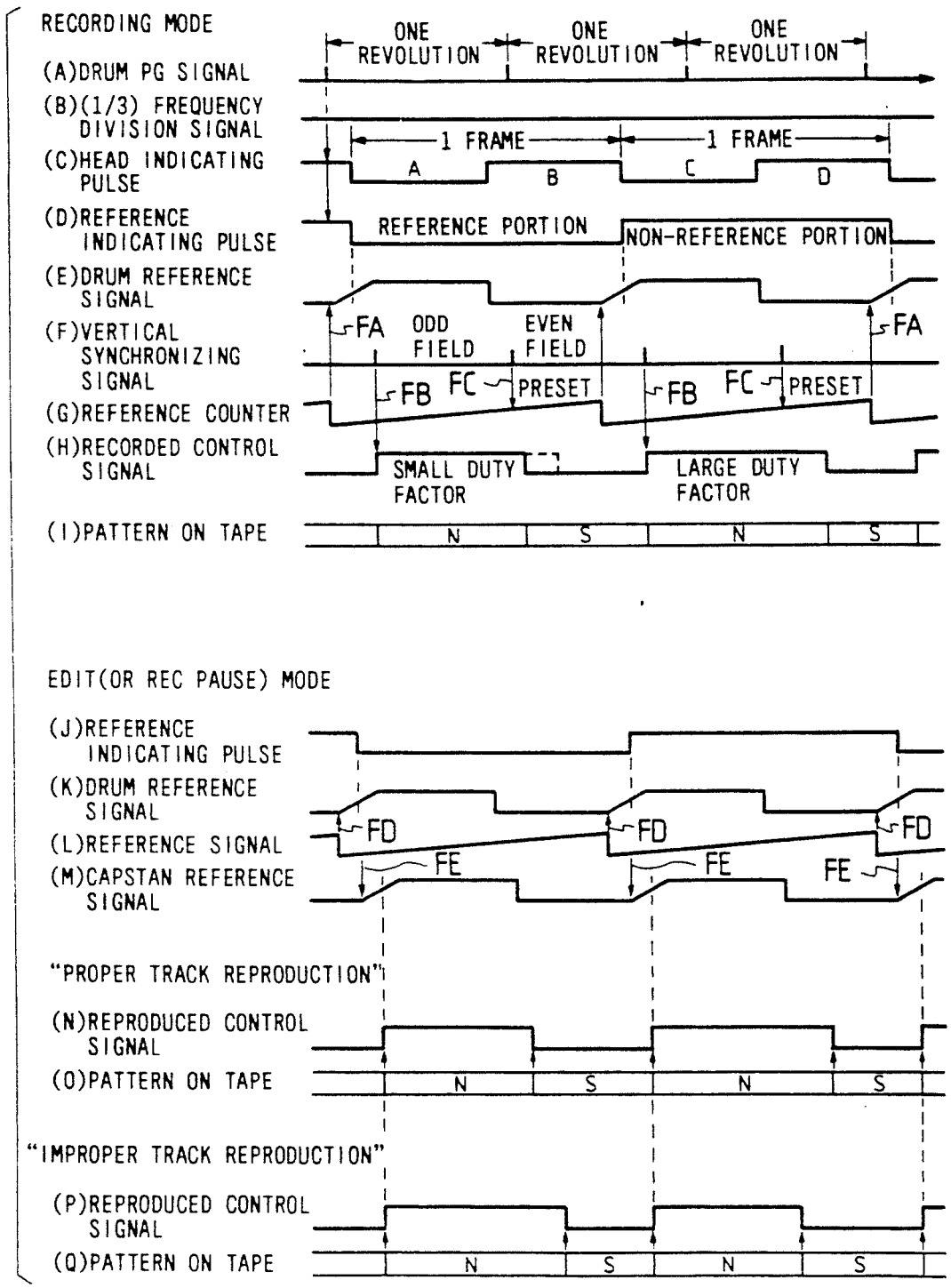
FIG. 5 is a timing chart for illustrating an operation of the embodiment of FIG. 1 for preventing the occurrence of the "improper track reproduction"

In this embodiment, the control signal is recorded in such a manner that a portion, which corresponds to the reference portion of the reference indicating signal, of the control signal has a small duty factor and in contrast another portion, which corresponding to the non-reference portion of the reference indicating signal, of the control signal has a large duty factor as illustrated in FIG. 5(H). Namely, a drum reference signal rises (as indicated as an arrow FA in FIG. 5(E)) at the time (see FIG. 5(G)) of starting a counting operation in a reference counter preset at the time (indicated by an arrow FC in FIG. 5) of occurrence of a vertical synchronizing signal of an even field. Further, the control signal rises (as indicated an arrow FB) at the time of occurrence of the vertical synchronizing signal of an odd field (see FIG. 5(F)). Furthermore, the duty factor of the control signal is set to be large or small depending on whether the control signal rises in a period of time corresponding to the reference portion or the non-reference portion of the reference indicating signal. The recorded control signal on the tape has a pattern as illustrated in FIG. 5(I).

Next, operations of this embodiment in an edit mode and a REC pause mode will be described hereinbelow. The drum reference signal and a capstan reference signal rise at the times as respectively indicated by arrows FD and FE on the basis of the count held in the reference counter (see FIGS. 5(k), (L) and (M)). When the "proper track reproduction" is performed, the duty factor of the control signal changes as illustrated in FIG. 5(N) and further the control signal recorded on the tape has a pattern as illustrated in FIG. 5(O).

In contrast, when the "improper track reproduction" is effected, the duty factor of the control signal changes as illustrated in FIG. 5(P) and further the control signal recorded on the tape has a pattern as illustrated in FIG. 5(Q). Consequently, in case of "improper track reproduction," the corresponding relation between the reference indicating pulse of FIG. 5(J) and the reproduced control signal of FIG. 5(P) is different from the corresponding relation between the reference indicating pulse of FIG. 5(D) and the reproduced control signal of FIG. 5(H). At that time, the tape is made to travel by a distance corresponding to a video signal frame on a video track thereof and further the "improper track reproduction" is switched over to the "proper track reproduction".

In this embodiment, the recorded control pulse is set to have a small duty factor corresponding to the reference portion of the reference indicating pulse and is set to have a large duty factor corresponding to the non-reference portion of the reference indicating pulse. Thus, in other modes, the comparators detect whether the reproduced control pulse has a large duty factor corresponding to the reference portion of the reference indicating pulse and whether the reproduced control pulse has a small duty factor corresponding to the non-reference portion of the reference indicating pulse. If it is detected in at least two consecutive frames that the reproduced control pulse has a large duty factor corresponding to the reference portion of the reference indicating pulse or has a small duty factor corresponding to the non-reference portion of the reference indicating pulse, it is determined that "improper track reproduction" is occurring.

Next, an operation of controlling the electronic splicing by using the indication signal in case of preventing the occurrence of the "improper track reproduction" in the above described manner will be described hereinbelow by referring to FIG. 6. When a recording pause instruction is issued in the course of a recording operation with the intention of performing an electronic splicing operation, an indication signal, of which the duty factor is equal to 65%, and another indication signal, of which the duty factor is equal to 60%, are alternatively recorded on the tape as a control signal (see FIG. 6(B)). At that time, the recorded control signal on the tape has a pattern as illustrated in FIG. 6(C).

Further, at the time (indicated by an arrow FF) when a pulse, which follows immediately after a fifth pulse or a (2n+1)'th pulse (n is a positive integer) of the indication signal, of a head indicating signal shown in FIG. 6(A) falls, a video signal gets into a "muted" state, that is, the recording of the video signal is suppressed (see FIG. 6(D)). Then, at the time (indicated by an arrow FG) when about 1 millisecond (mS) elapses from a fall of a sixth pulse or a 2m'th pulse (m is an integer greater than one) of the indication signal, the recording of the control signal is ceased (see FIGS. 6(B), (C) and (E)). After that, the tape is rewound by a predetermined distance.

Next, when the pause (or temporary stop) in the recording of the video signal is ended and the recording operation is resumed, the rewound tape is driven and further the control signal recorded as above described is reproduced (see FIG. 6(L)). Namely, the processing of detecting the pattern of the recorded control signal on the tape (see FIG. 6(F)) is effected (see FIG. 6(G)) and the recorded control signal is thus reproduced (see FIG. 6(H)).

At that time, the reference value used by the second comparator 26 and the detected duty factor change from 62.5% to 57.5% (as indicated by an arrow FJ in FIG. 6(J)). Further, it has become that the indication signal is continuously detected.

Figure 6:
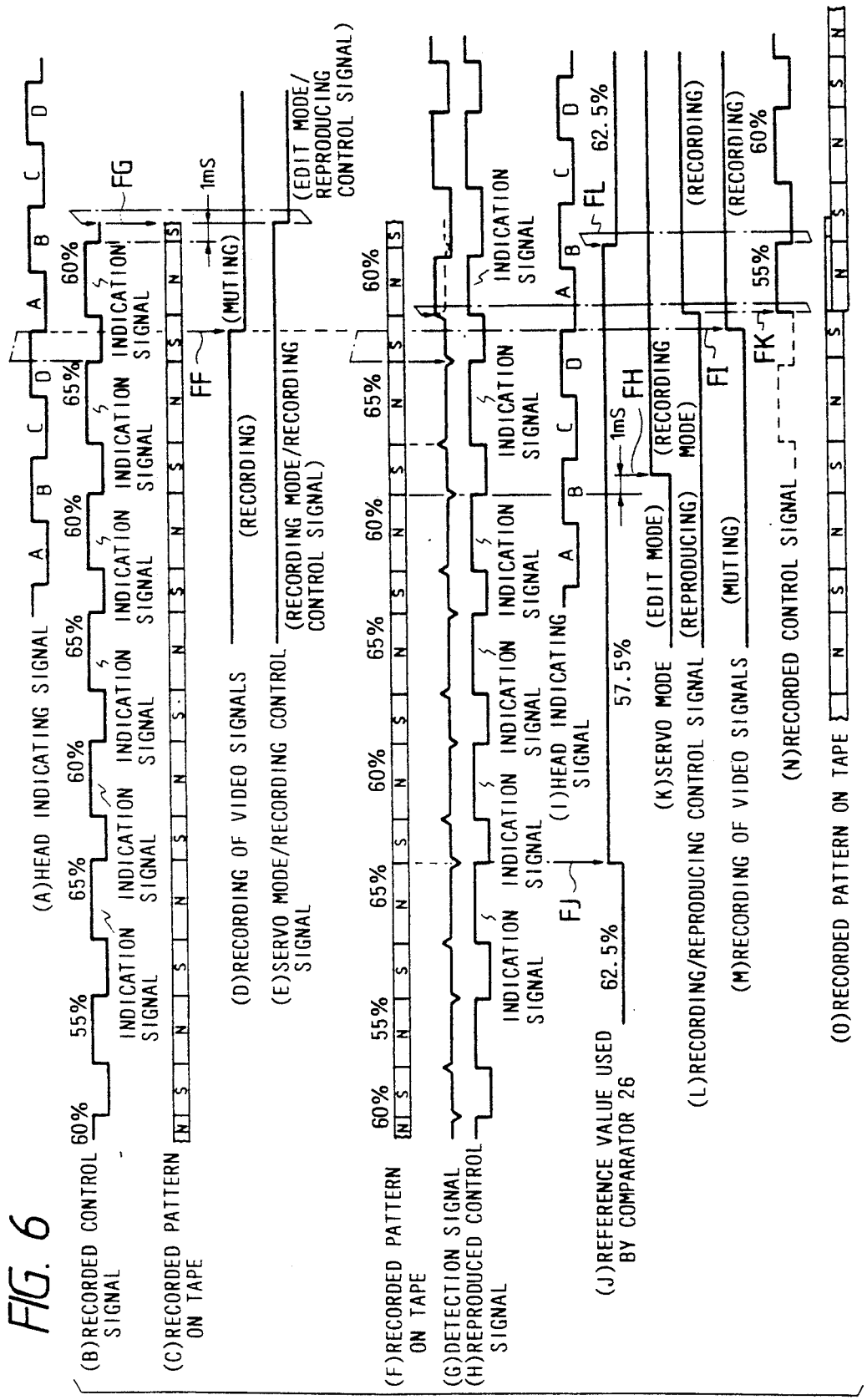
FIG. 6 is a timing chart for illustrating an operation of the embodiment of FIG. 1 for carrying out an electronic splicing operation.

Thereafter, at the time (indicated by an arrow FH) when about 1 mS elapses from a fall of a fourth pulse or 2n'th of the indication signal, a servo mode gets into a recording mode (see FIG. 6(k)). Further, the recording of video signals is started (FIG. 6(M)) at the time (indicated by an arrow FI) when a pulse, which follows immediately after a fifth pulse or a (2n+1)'th pulse of the indication signal, of the head indicating signal falls (see FIG. 6(I)). As above described, the "muting" of the video signal is effected at the time when the pulse, which follows immediately after the fifth pulse of the indication signal, of the head indicating signal falls, so that the electronic splicing of the video signal is carried out without loss of a video track on which the video signal is recorded. In FIG. 6, the arrows FF and FI indicate splice points, at each of which two adjacent records of video signals are spliced (i.e., starting positions of frames, each of which does not overlap with an adjacent frame).

Incidentally, the recording of the control signal is started (see FIG. 6(N)) at the time (indicated by an arrow FK) when a period of time corresponding to one frame elapses from the time (indicated by the arrow FH) of changing a servo mode. Thus, the recorded control signal on the tape has a pattern as illustrated in FIG. 6(O). Further, when the pulse, which has the duty factor of 55%, of the control pulse of which the recording is resumed, the duty factor and the reference value of the second comparator 26 are changed into 62.5% (as indicated by an arrow FL in FIG. 6(J)). Furthermore, since the operation of preventing the occurrence of the "improper track reproduction" is performed in parallel with this operation of controlling the electronic splicing, the head indicating signals shown in FIGS. 6(A) and (I) are thoroughly in conformity with each other.

While a preferred embodiment of the present invention has been described above, it is to be understood that the present invention is not limited thereto and that other modifications will be apparent to those skilled in the art without departing from the spirit of the invention.

For example, in the above described embodiment, the duty factor of the control signal is changed in accordance with TABLE 2. The duty factor of the control signal, however, can be changed as illustrated in FIGS. 7 and 8.

Figure 7A:
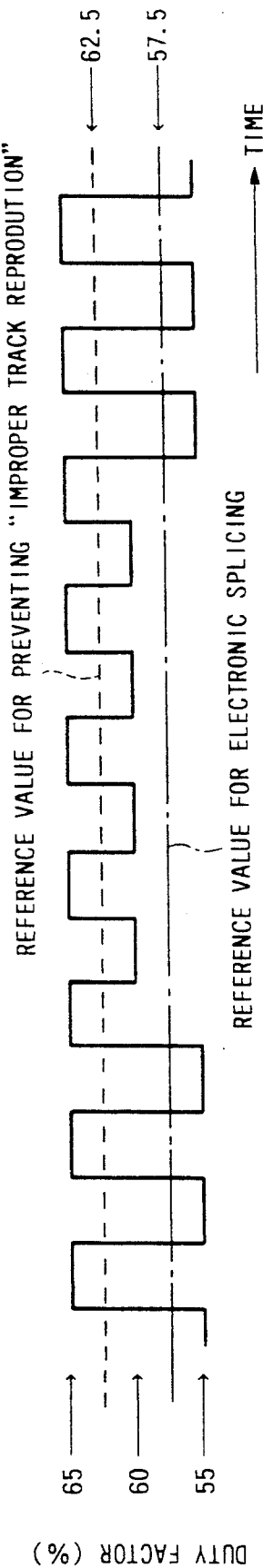
FIG. 7(A)–7(B) is a diagram for illustrating another embodiment of the present invention.

First, in another embodiment (hereunder sometimes referred to as a second embodiment) in which the duty factor of the control signal is changed as illustrated in FIG. 7(A), interruption pulses having a large duty factor of 65% and other interruption pulses having a small duty factor of 60% for the electronic splicing intervene in pulses having a large duty factor of 65% and other pulses having a small duty factor of 55% of a normal code signal. In the second embodiment, a reference value used by a comparator for making a comparison for preventing the occurrence of the "improper track reproduction" is set to be 62.5%; and another reference value for performing the electronic splicing 57.5%.

Figure 7B:
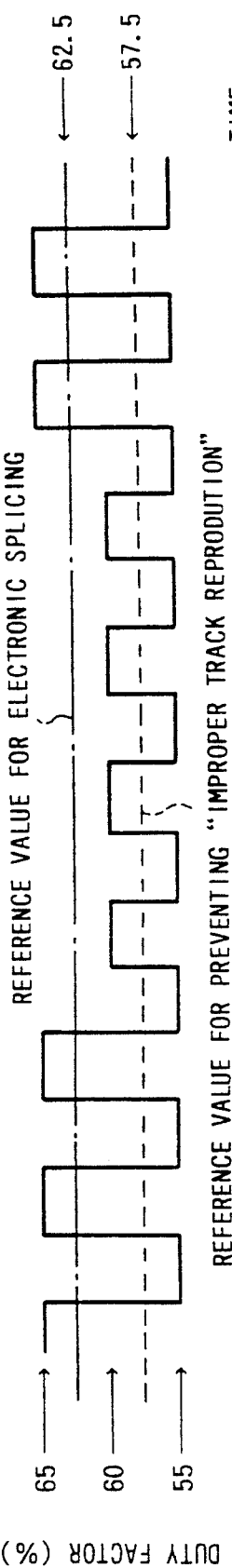
Figure 9:
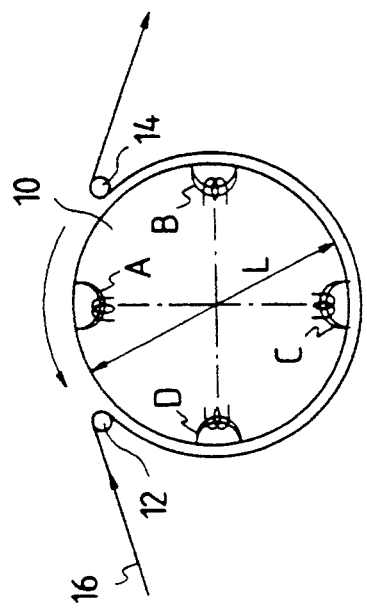
FIG. 9 is a diagram for illustrating the arrangement of video heads of a VTR to which the present invention is applied.
Figure 10:
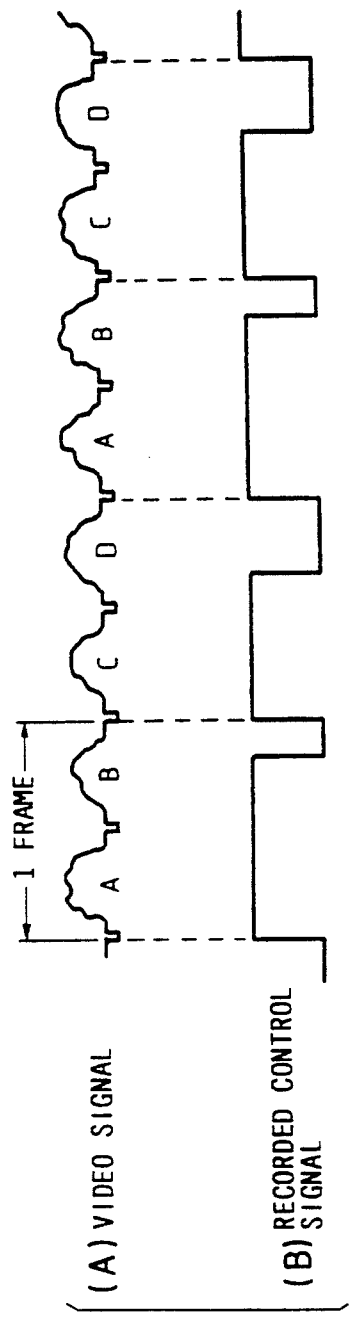
FIG. 10 is a waveform diagram for illustrating the relation between a video signal and a control signal used for preventing the occurrence of the "improper track reproduction"
Figure 11:
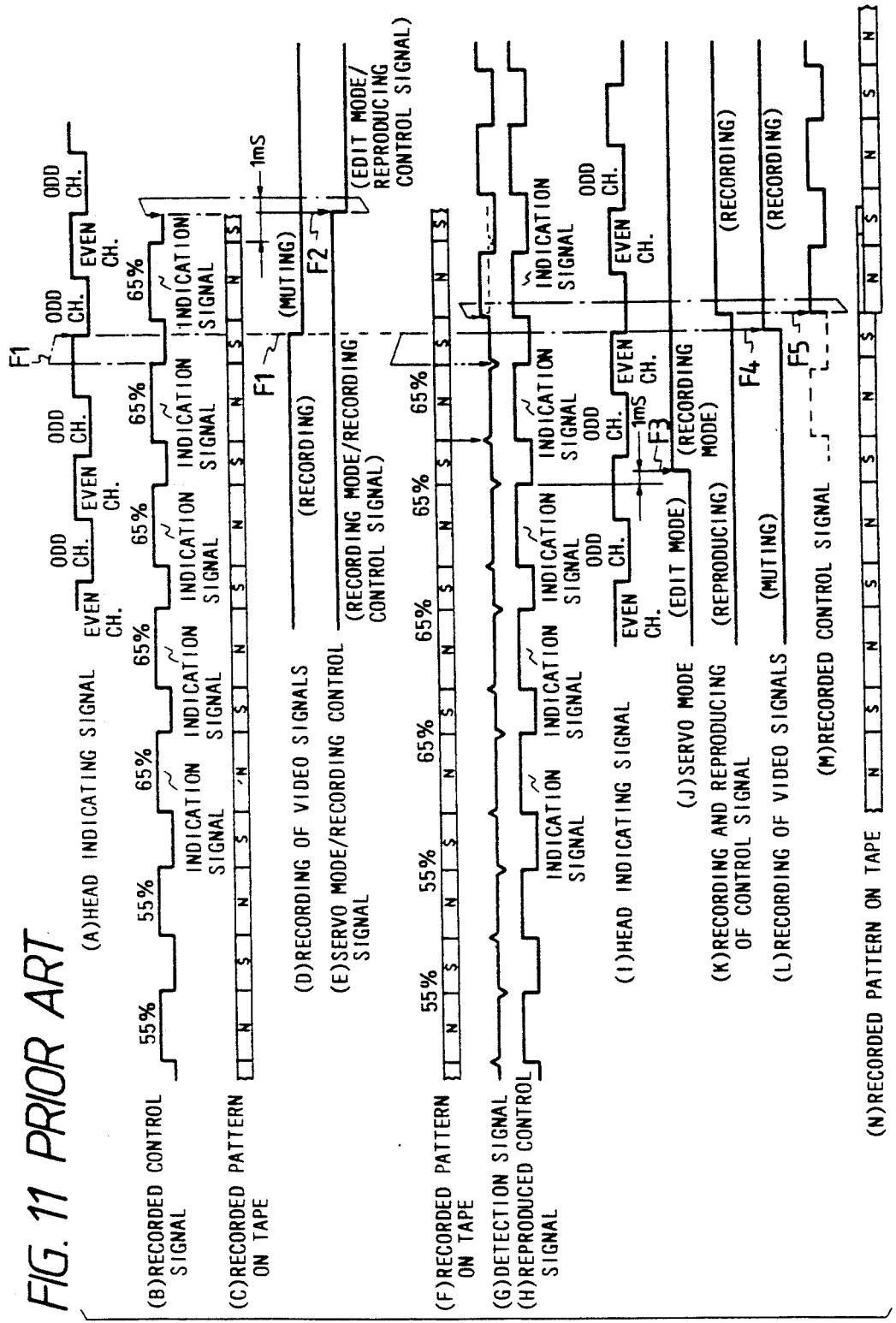
FIG. 11 is a timing chart for illustrating an electronic splicing operation of the VTR of FIG. 10.

Further, still another embodiment (hereunder sometimes referred to as a third embodiment) in which the duty factor of the control signal is changed as illustrated in FIG. 7(B), interruption pulses having a large duty factor of 60% and other interruption pulses having a small duty factor of 55% for the electronic splicing intervene in pulses having a large duty factor of 65% and other pulses having a small duty factor of 55% of a normal code signal. In the third embodiment, a reference value used by a comparator for making a comparison for preventing the occurrence of the "improper track reproduction" is set to be 57.5%; and another reference value for performing the electronic splicing 62.5%. As can be seen from FIGS. 7(A) and (B), the waveform of the control signal in case of the third embodiment is obtained by inverting that of the control signal in case of the second embodiment.

In addition, yet another embodiment (i.e., a fourth embodiment) employs a control signal, of which the waveform is illustrated in FIG. 8 and is obtained by inverting that of the control signal shown in FIG. 3. Even in case of the fourth embodiment, the comparison between the duty factor of the control signal and the reference value for preventing the occurrence of the "improper track reproduction" and effecting the electronic splicing can be performed in a similar manner as in cases of the first, second and third embodiments.

In the second, third and fourth embodiments, the large duty factor of the normal code signal, which is set as equal to the small duty factor of the indication signal, is 60% as shown in TABLE 2. It is, however, not necessary to set the large duty factor of the normal code signal as equal to the small duty factor of the indication signal. The closer the large duty factor of the normal code signal approaches the small duty factor of the indication signal become, the comparison between the duty factor of control signal and the reference value for preventing the occurrence of the "improper track reproduction" can be more easily made.

The scope of the present invention, therefore, is to be determined solely by the appended claims.

What is claimed is:

1. An electronic-splicing-operation control device in a four-head type magnetic recording and/or reproducing apparatus, said four-head type magnetic recording and/or reproducing apparatus including:
   a) two mutually orthogonal pairs of video heads for recording and/or reproducing video signals on videotape, each of said pairs of video heads having a first video head and a second video head opposite to said first video head;
   b) a control head for recording and/or reproducing control signals on the videotape; and
   c) control signal reproducing means connected to said control head for reproducing recorded control signals from the videotape,
      wherein said electronic-splicing-operation control device is for controlling an electronic splicing operation of said four-head type magnetic recording and/or reproducing apparatus in such a manner as to prevent one of said first and second video heads from reproducing video signals recorded by the other of said first and second video heads, such that video signals are recorded and reproduced by an identical video head, said electronic-splicing-operation control device comprising:
      (i) control signal detecting means, connected to receive a control signal reproduced by said control signal reproducing means, for comparing the duty factor of the reproduced control signal with predetermined first to fourth reference values to detect whether the received control signal is a normal code signal having a duty factor the value of which is one of first and second values or is an indication signal corresponding to an electronic splicing operation and having a duty factor the value of which is one of third and fourth values, and for outputting a signal representing information on the results of the detection, the first value being predetermined to be less than the second value, the third value being predetermined to be less than the fourth value and to be nearly equal to the second value, the first reference value being predetermined to be less than the first value, the second reference value being predetermined to be less than the first value and greater than the first reference value, the third reference value being predetermined to normally be greater than each of the first value and the second reference value and less than the second value, said control signal detecting means changing the third reference value to a fifth reference value less than the fourth value and greater than each of the second and third values when said signal detecting means receives a reproduced control signal having a duty factor greater than each of the second and third values, the fourth reference value being predetermined to normally be greater than the third value, said control signal detecting means changing the fourth reference value to a sixth reference value less than each of the second and third values and greater than the first value when said signal detecting means receives a reproduced control signal having a duty factor greater than each of the second and third values;

(ii) control means, connected to receive the signal output by said control signal detecting means, for controlling normal recording of video signals and control signals on the videotape and normal reproducing of the recorded video and control signals from the videotape and for controlling an electronic splicing operation in such a manner as to prevent one of said first and second video heads from reproducing video signals recorded by the other of said first and second video heads according to the signal received from said control signal detecting means and for outputting a signal representing an instruction that a normal code signal or an indication signal should be recorded on the videotape; and (iii) control signal recording means connected to both of said control means and said control head for receiving the signal outputted by said control means, and for generating normal code signals and indication signals in response to the signal received from said control means, for alternately outputting the generated normal code signal having a duty factor of the first value and the generated normal code signal having a duty factor of the second value to said control head to prevent one of said first and second video heads from reproducing video signals recorded by the other of said first and second video heads so as to perform the recording and reproducing of the video signals by an identical video head, or for alternately outputting the generated indication signal having the duty factor the value of which is the fourth value and the generated normal code signal having the duty factor the value of which is the third value, to said control head.

2. The electronic-splicing-operation control device as set forth in claim 1, wherein said control signal detecting means comprises:

a first duty-factor comparing means for detecting the normal code signals respectively having the duty factors of the first and second values by comparing the value of the duty factor of the control signal received from the said control signal reproducing means with each of the first to third reference values during normal recording of video signals and for detecting the indication signals respectively having the duty factors of the third and fourth values by comparing the value of the duty factor of the control signal received from said control signal reproducing means with each of the first, second and fifth reference values during electronic splicing of video signals; and a second duty-factor comparing means for detecting the indication signals respectively having the duty factors of the third and fourth values by comparing the value of the duty factor of the control signal received from said control signal reproducing means with the sixth reference value during the electronic splicing of video signals and for detecting the normal code signals having the duty factors of the first and second values by comparing the value of the duty factor of the control signal received from said control signal reproducing means with the fourth reference value during the normal recording of video signals.

3. A four-head type magnetic recording and/or reproducing apparatus having two mutually orthogonal pairs of video heads for recording and/or reproducing video signals on videotape, each of said pairs of video heads having a first video head and a second video head opposite to said first video head, said apparatus having a function of electronically splicing a record of video signals to another record of video signals previously recorded on videotape, said four-head type magnetic recording and/or reproducing apparatus comprising:

a control head for recording and/or reproducing control signals on the videotape;

control signal reproducing means connected to said control head for reproducing recorded control signals from the videotape;

control signal detecting means, connected to receive a control signal reproduced by said control signal reproducing means, for comparing the duty factor of the reproduced control signal with predetermined first to fourth reference values to detect whether the received control signal is a normal code signal having a duty factor the value of which is one of first and second values or is an indication signal corresponding to an electronic splicing operation and having a duty factor the value of which is one of third and fourth values, and for outputting a signal representing information on the results of the detection, the first value being predetermined to be less than the second value, the third value being predetermined to be less than the fourth value and to be nearly equal to the second value, the first reference value being predetermined to be less than the first value, the second reference value being predetermined to be less than the first value and greater than the first reference value, the third reference value being predetermined to normally be greater than each of the first value and the second reference value and less than the second value, said control signal detecting means changing the third reference value to a fifth reference value less than the fourth value and greater than each of the second and third values when said signal detecting means receives a reproduced control signal having a duty factor greater than each of the second and third values, the fourth reference value being predetermined to normally be greater than the third value, said control signal detecting means changing the fourth reference value to a sixth reference value less than each of the second and third values and greater than the first value when said signal detecting means receives a reproduced control signal having a duty factor greater than each of the second and third values;

control means, connected to receive the signal outputted by said control signal detecting means, for controlling operations of normal recording of video signals and control signals on the videotape and reproducing recorded video signals and control signals from the videotape and for controlling an electronic splicing operation in such a manner as to prevent one of said first and second video heads from reproducing video signals recorded by the other of said first and second video heads according to the signal received from said control signal. detecting means and for outputting a signal representing an instruction that a normal code signal or an indication signal should be recorded on the videotape; and control signal recording means connected to both of said control means and said control head for receiving the signal outputted by said control means, and for generating normal code signals and indication signals in response to the signal received from said control means, for alternately outputting the generated normal code signal having a duty factor of the first value and the generated normal code signal having a duty factor of the second value to said control head, to prevent one of said first and second video heads from reproducing video signals recorded by the other of said first and second video heads so as to perform the recording and reproducing of the video signals by an identical video head, or for alternately outputting the generated indication signal having a duty factor of the fourth value and the generated normal code signal having a duty factor of the third value to said control head.

4. The four-head type magnetic recording and/or reproducing apparatus as set forth in claim 3, wherein said control signal detecting means comprises:

a first duty-factor comparing means for detecting the normal code signals respectively having the duty factors of the first and second values by comparing the value of the duty factor of the control signal received from the said control signal reproducing means with each of the first to third reference values during normal recording of video signals and for detecting the indication signals respectively having the duty factors of the third and fourth values by comparing the value of the duty factor of the control signal received from said control signal reproducing means with each of the first, second and fifth reference value during the electronic splicing of video signals; and a second duty-factor comparing means for detecting the indication signals respectively having the duty factors of the third and fourth values by comparing the value of the duty factor of the control signal received from said control signal reproducing means with the sixth reference value during the electronic splicing of video signals and for detecting the normal code signals having the duty factors of the first and second values by comparing the value of the duty factor of the control signal received from said control signal reproducing means with the fourth reference value during normal recording of video signals.

* * * * *